United States Patent
Singh et al.

(10) Patent No.: US 12,333,004 B2
(45) Date of Patent: Jun. 17, 2025

(54) PRIVILEGED FIRMWARE MODE PROTECTION

(71) Applicant: Samsung Electronics Co., Ltd., Suwon-si (KR)

(72) Inventors: Baibhav Singh, Sunnyvale, CA (US); Stephen Elliot McLaughlin, San Jose, CA (US); Hayawardh Vijayakumar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 17/968,182

(22) Filed: Oct. 18, 2022

(65) Prior Publication Data

US 2023/0418937 A1 Dec. 28, 2023

Related U.S. Application Data

(60) Provisional application No. 63/355,969, filed on Jun. 27, 2022.

(51) Int. Cl.
*G06F 21/55* (2013.01)
*G06F 21/54* (2013.01)
*G06F 21/60* (2013.01)

(52) U.S. Cl.
CPC ............ *G06F 21/554* (2013.01); *G06F 21/54* (2013.01); *G06F 21/604* (2013.01)

(58) Field of Classification Search
CPC ....... G06F 21/554; G06F 21/54; G06F 21/604
See application file for complete search history.

(56) References Cited

U.S. PATENT DOCUMENTS

| | | | |
|---|---|---|---|
| 9,477,848 B2 | 10/2016 | Nicholes | |
| 10,565,141 B1 | 2/2020 | Chaiken | |
| 11,188,640 B1 * | 11/2021 | Powell | G06F 21/60 |
| 2021/0026948 A1 | 1/2021 | Ndu | |
| 2021/0064770 A1 * | 3/2021 | Yu | H04L 63/10 |
| 2021/0240489 A1 * | 8/2021 | Xie | G06F 21/572 |
| 2021/0256132 A1 * | 8/2021 | Lewis | G06F 21/554 |

OTHER PUBLICATIONS

Delgado et al., "Applying the Principle of Least Privilege to System Management Interrupt Handlers with the Intel SMI Transfer Monitor", HASP '20, Oct. 17, 2020 (Year: 2020).*

* cited by examiner

*Primary Examiner* — Henry Tsang

(57) ABSTRACT

In one embodiment, a method includes accessing a request from a lower privileged process executing on a computing device to access a privileged firmware mode of the computing device and accessing a set of access policies for detecting whether the request is an unauthorized access to the privileged firmware mode. The method further includes determining, based on at least part of a content of the request and on the set of access policies, whether the request to access a privileged firmware mode is authorized; and denying or permitting, based on the determination, access by the lower privileged process to the privileged firmware mode.

20 Claims, 4 Drawing Sheets

| Section | Key | Usage |
|---|---|---|
| Header 310 | FormatVersion | Stores the Rulefile schema's version number. Any change in the schema of the Rulefile will increase the format version number. |
| | MinBIOSVersion | The minimum BIOS version supports the rule file. |
| | MaxBIOSVersion | The Maximum BIOS version supports the rule file. |
| | ContentVersion | Stores the Rule's version number. Every rule update will increase the content version number. |
| | HandlerRuleList | Contain a list of all monitored SMI handlers and their rule list. |
| | HandlerID | GUID of the SMI handler. |
| | Rules | Contains a list of all the rules that are applied to the SMI handler. |
| | RuleID | The unique ID is assigned to each rule. |
| Content 320 | RuleType | Specifies the rule category. It may contain the following categories.<br>•Detect: Detect rules detect any exploit attempts with SMI requests. The requested SMI can be blocked if the shared buffer satisfies the *Detect* rule conditions.<br>•Allow: Allow rules to allow only benign SMI requests. The SMI request can be allowed only if the shared buffer satisfies the *Allow* rule conditions. Only one Allow rule is allowed per handler. |
| | Condition | Contains a list of all conditions for a rule. |
| | ConditionType | Classifies the condition type. The following condition types may be used:<br>•DataAtOffset: The condition will check for data at a particular offset.<br>•PatternCheck: The condition will check for a byte pattern in the communication buffer.<br>•Constant: The condition will always return a constant value. |
| | Offset | The byte offset points to data in the shared buffer to read. This attribute is valid only for the DataAtOffset condition type. |
| | Datasize | The number of bytes to read. This attribute is valid only for the DataAtOffset condition type. |
| | Data | Actual data against which the condition is validated. This attribute is valid only for the *DataAtOffset* condition type. |
| | Pattern | Regular expression to search in the shared buffer. This attribute is valid only for the *PatternCheck* condition type. |
| | Operation | Condition operations to validate the conditions. Supported operations may include the following:<br>• "<" → Less than validation<br>• ">" → Greater than validation<br>• "=" → Equal validation |
| | RuleAction | This determines the list of actions for access requests when the rule is or is not satisfied. Possible actions may include:<br>•Allow: Allow the request.<br>•Audit mode: Record a violation but continue system operation<br>•Block: Block the SMI request. |
| Signature 330 | SignatureKeyId | Unique identifier to identify the key used to generate the signature. |
| | Algorithm | The algorithm used to generate the signature. |
| | SignatureData | The actual signature may be in Base64 format. |

Fig. 3

PRIVILEGED FIRMWARE MODE PROTECTION

PRIORITY CLAIM

This application claims the benefit, under 35 U.S.C. § 119, of U.S. provisional patent application no. 63/355,969 filed 27 Jun. 2022, the entirety of which is incorporated herein by reference.

TECHNICAL FIELD

This application generally relates to protection of a privileged firmware mode of a computing device.

BACKGROUND

Computer hardware, such as central processing units (CPUs), may have different operating modes that are associated with different permissions on the types of operations that can be performed. For example, a CPU may have a privileged (or unrestricted) mode that permits all types of operations, such as instructions, I/O operations, memory accesses, power management, and system hardware control. A CPU may also have one or more restricted modes in which some of the operations are not permitted. A privileged mode may support manufacturer-specific tasks independent of the operating system executing on the device.

Firmware, such as a BIOS or UEFI, can support privileged operating modes (also referred to herein as privileged processor modes or privileged firmware modes). For example, system management mode (SMM) is a component of one type of BIOS that resides below the operating system and supports persistent storage (e.g. UEFI variables), BIOS configuration interface, and other critical functions. To secure the firmware and privileged processing modes (such as SMM) against attacks, such as hacking attacks, it is necessary to regularly update firmware to patch vulnerabilities and address new kinds of attacks. However, patching firmware is a slow and difficult process, patches are ineffective at protecting a device until they are deployed on a device, and there may be thousands to hundreds of millions of devices to patch when a new firmware update is released.

BRIEF DESCRIPTION OF THE DRAWINGS

FIG. 3 illustrates example content of a set of access policies for protecting a privileged firmware mode.

DESCRIPTION OF EXAMPLE EMBODIMENTS

Figure 1:
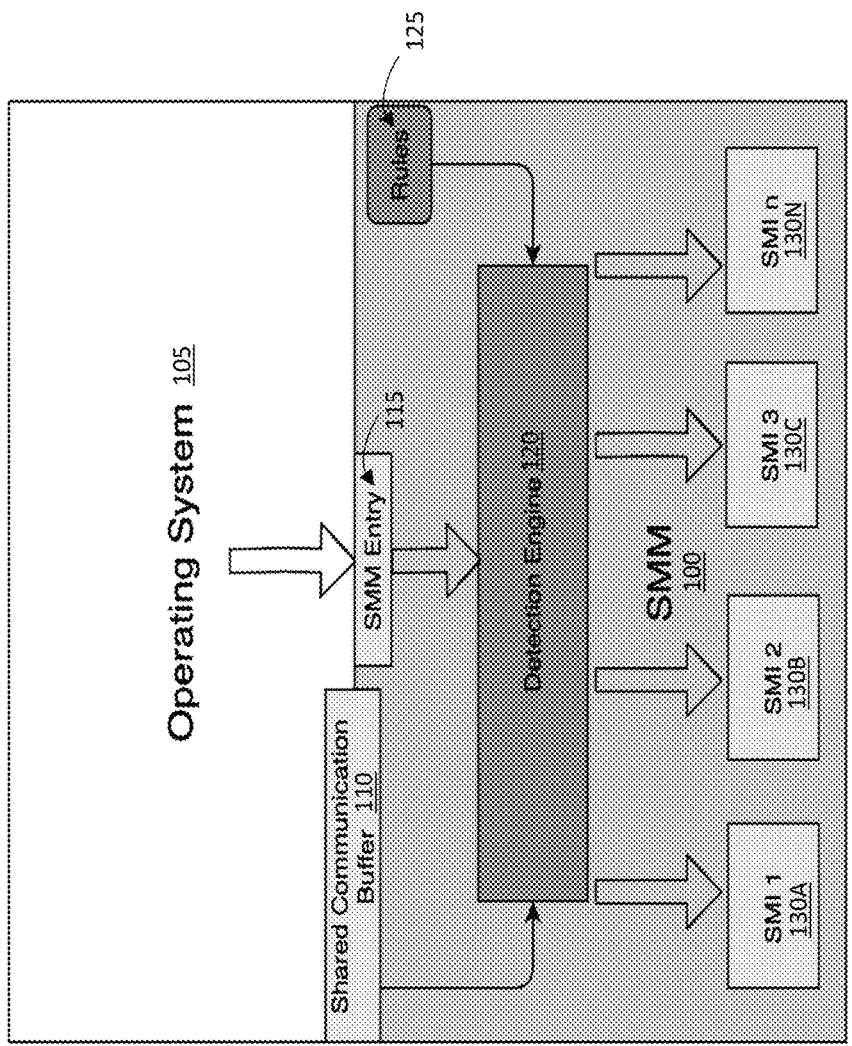
FIG. 1 illustrates an example architecture that protects a privileged firmware mode.

Privileged firmware modes are frequently targets for malicious code because the privileged firmware modes provide access to all of the system's operations and resources. When a new vulnerability is discovered or a new attack occurs, protecting a device from attack to prevent malicious access to privileged firmware modes typically requires updating firmware, which is a slow process and requires device-end action to obtain and install the firmware update. For example, even after a firmware update is installed a restart of the device is typically required to implement the updated firmware, and so a device that obtains a firmware update addressing malicious attacks is still vulnerable to the attacks until the device restarts, which a user may put off doing.

In addition, firmware updates and distribution tend to be long and difficult processes for the distributor to implement; for example, a firmware may be updated on a 3-month or 6-month schedule, providing poor real-time protection to existing vulnerabilities and providing wider windows of opportunity for an attacker to exploit vulnerabilities and run malware in the privileged firmware mode. In addition, because privileged firmware modes provide access to persistent and critical device resources, attacks that gain malicious access to privileged firmware modes may not be rectified by drive formats and device installations, which typically do not have access to all system resources and therefore cannot cure these kinds of attacks. The fact that many devices, such as hundreds of millions of devices, typically need to be updated makes protecting the privileged firmware mode a challenging process.

A firmware component (such as SMM) that provides access to privileged firmware modes uses a shared communication buffer with the OS to enable communication between the OS and the SMM. For example, an OS may submit a request for access to a privileged power-management setting or to a persistent storage of the computing device. The shared buffer is an entry point for a compromised OS (e.g., an OS infected by a virus) to exploit SMM vulnerability and access privileged firmware modes.

As explained more fully herein, embodiments of this disclosure provide a detection engine that intercepts OS communications in the shared communication buffer and analyzes the contents of the communications to determine, in real-time, whether the communication is an anomalous or hazardous request. The detection engine can either deny the OS request or permit the OS request to pass to the requested service. As explain more fully herein, the detection engine can use a variety of approaches and policies to determine whether to deny or permit a request, and these policies can be updated by, e.g., being pushed to the device without requiring a device restart. Therefore, the detection engine protects the device from malicious access to privileged firmware modes, and vulnerabilities can be addressed in much shorter timelines (e.g., in a day or less) through targeted updates to the detection-engine policies, without requiring an update to the entire firmware.

FIG. 1 illustrates an example architecture that protects a privileged firmware mode. As illustrated in the example of FIG. 1, a lower-privileged process, such as OS 105, submits a request to access a privileged resource, such as a system management interrupt (SMI). SMM 100 typically includes many SMIs, such as SMIs 130A, 130B, 130C, up to 130N, each of which provides a specific function (e.g., access to a specific memory region, power management, etc.). Shared communication buffer 110 is used to facilitate communication between the lower-privileged process (in this example, OS 105) and SMM 100. When a request is received in shared communication buffer 110, a handler function takes control to service the request. SMI entry 115 is the shared entry point for requests to access SMM 100, such as for requests to access an SMI.

As illustrated in the example of FIG. 1, a detection engine 120 intercepts control over the flow for servicing a request to access SMM 100 and determines whether to permit the request or deny the request. For example, detection engine 120 may include a hook, e.g., an intercept, within SMM entry 115 that, when a lower-privileged request is made, transfers control from the SMI handler to detection engine 120. In particular embodiments, the hook may pass a pointer to the request at issue in shared communication buffer 110, and detection engine 120 may then access the contents of that request. As described more fully herein, detection engine 120 accesses rules, or policies, 125 to determine whether to permit or deny a request to access SMM 100. Thus, if a lower privileged process such as OS 105 is comprised and attempts to exploit the SMI handler using shared communication buffer 110, detection engine 120 can interrupt access to SMM 100 to prevent in real-time malicious attacks before they gain access to SMM 100.

In particular embodiments, a privileged mode takes total control over the CPU while the privileged mode is executing. As a result, unprivileged processes (such as, e.g., the OS) cannot run on any CPU core at the same time the privileged mode is executing. Alternatively, particular embodiments make a copy of the request submitted by a process and received in the shared communication buffer, and then use this copy to evaluate and service the request. These approaches circumvent an attack that (1) initially provides valid input to the communication buffer in order to pass the detection engine's analysis and then, after being approved by the detection engine, (2) attempts to change the content in the shared communication buffer to malicious code. In particular embodiments, the specific approach used depends on the specific processor architecture in the computing device.

As illustrated in FIG. 1, detection engine 120 accesses rules 125 to determine whether to permit access to a requested SMI or whether to deny the request. A file containing rules/policies 125 may be stored in a protected area of the firmware, such as a storage location where persistent values are stored. If detection engine 120 is enabled in the firmware, then the rule file may be verified using, e.g., cryptographic techniques such as a public key to ensure the integrity of the rule file. If the verification succeeds, then detection engine 120 can use rules 125 in the rule file to determine whether to service SMM access requests; otherwise, detection engine 120 may be disabled and an alert (e.g., to a user or to a log file) may be provided. The file that contains rules 125 may be updated by, e.g., pushing the updated content to relevant devices, and new vulnerabilities may therefore be addressed with new or modified rules, as described more fully herein. While the example of FIG. 1 describes a specific architecture in the context of SMM 100, which is a specific type of privileged firmware mode, this disclosure contemplates that the detection engine may be used to any suitable type of privileged firmware mode.

Figure 2:
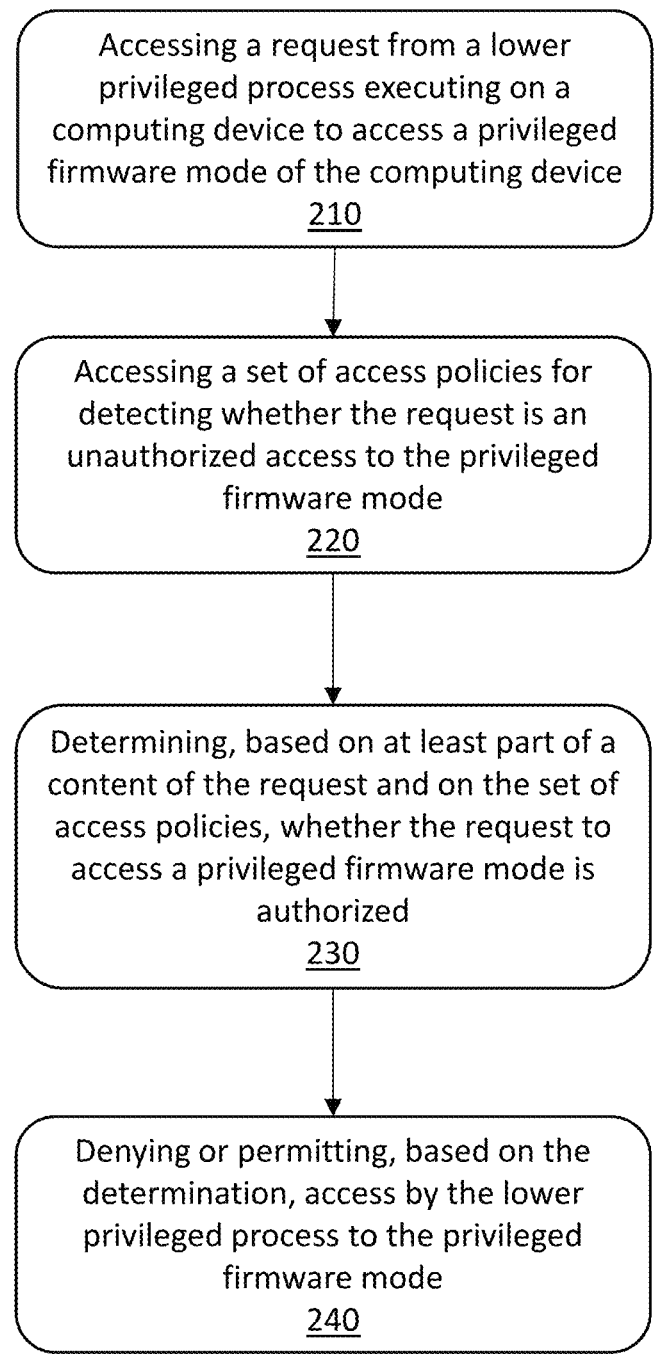
FIG. 2 illustrates an example method for protecting a privileged firmware mode.

FIG. 2 illustrates an example method for protecting a privileged firmware mode. At step 210, the method of FIG. 2 includes accessing a request from a lower privileged process executing on a computing device to access a privileged firmware mode of the computing device. For example, as explained above with reference to the example of FIG. 1, the lower privileged process may be an operating system, and the request may be a request to access an SMI service.

Step 220 of the example of FIG. 2 includes accessing a set of access policies for detecting whether the request is an unauthorized access to the privileged firmware mode, and step 230 includes determining, based on at least part of a content of the request and on the set of access policies, whether the request to access a privileged firmware mode is authorized. For example, FIG. 3 illustrates example content of a set of access policies for protecting a privileged firmware mode. As explained herein, the file storing these access policies may be stored in a secure area of the firmware, and these contents may be updated as new vulnerabilities of the privileged firmware mode are discovered.

In particular embodiments, the detection engine may access the request in the shared communication buffer to extract identifying information of the service requested in the privileged mode, such as a GUID of an SMI. The detection engine may then use this identifier to determine which access policies, if any, apply to that specific request, and ultimately whether the request should be permitted or denied. As explained herein, whether to permit or deny a request may be an explicitly specified action based on the analysis of the request with the applicable access policies. In particular embodiments, if the identifier is not present in the access-policies file, then the request may be allowed by default.

FIG. 3 illustrates example content of a set of access policies for protecting a privileged firmware mode. The example of FIG. 3 includes a header section 310, a content section 320, and a signature section 330. While the example of FIG. 3 illustrates example sections, keys, and usages, this disclosure contemplates that access policies may take other forms and labels, and may be organized according to other formats. Moreover, while the example of FIG. 3, refers to SMIs and BIOSes, as explained above this disclosure contemplates any suitable service in a privileged firmware mode of any suitable firmware.

In the example of FIG. 3, header section 310 may contain a format version identifier, which identifies the version number of the access-policy file (or rule file). In particular embodiments, changes to the structure of the access-policy file will increase the format version number. In particular embodiments, header 310 may include an identification of a minimum and maximum firmware version supported by the detection-engine feature, as illustrated in the example of FIG. 3 identifying a "MinBIOSVersion" and a "MaxBIOSVersion."

In particular embodiments, content 320 includes metadata about the file, and also contains the access policies, or rules, used to determine whether to permit or deny a request to access the privileged firmware mode. For example, content 320 may include a content version that identifies the version of the policies used to allow or deny requests to access a privileged firmware mode. Content 320 may include an identification of all monitored services, such as SMIs, and associated policies, for example in the "HandlerRuleList" illustrated in the example of FIG. 3. Content 320 may include an identification of service IDs, such as GUIDs of SMI handlers, a list of all rules or policies, and a unique identifier associated with each rule or policy.

Content 320 may include an identification of different types of policies used to permit or deny requests to access a privileged firmware mode. For example, one type of policy may be an allow-based rule; for example, a rule that allows a request when certain recognized content is present in the request. As allow-based rules treat anomalous or unexpected content in the request as a potential attack, allow-bases rules can prevent the customer from zero-day unknown vulnerability exploits.

As another example, one type of policy may be a detect-based rule, which denies a request when specific content is present in a request. For example, if a known vulnerability is yet to be patched with an updated firmware, a detect-based rule can include a vulnerability-specific signature to detect an attack for that vulnerability on an outdated and vulnerable firmware.

In particular embodiments, content 320 may include one or more conditions and conditions type, which are used by policies to determine whether to allow or deny a request. For example, a condition type may include a "DataAtOffset" condition, which checks for specific data at a particular offset from a predetermined location, such as the start of the request in the shared communication buffer. In particular embodiments, the offset may be specified by an "offset" key for a particular policy, which specifies, e.g., in bytes, the offset to use to apply the policy. In particular embodiments, then specific number of bytes to read may be specified by a "Datasize" key, and the read data in the request may be validated against specific data in a "Data" key.

In particular embodiments, a condition type may include a "PatternCheck" condition, which check for a particular byte pattern in at least part of the request in the shared communication buffer. The specific expression, or pattern, to read may be specified by, for example, a "Pattern" key.

In particular embodiments, a condition type may include a "Constant" condition, which returns a constant value. For example, a constant condition may be a "true" (allow) or "false" (block), which may be used to always permit or always deny requests for access to specific privileged-mode services. As explained herein, the specific condition types discussed herein are examples of types of conditions that a detection engine may use to permit or deny access requests for a privileged mode, and this disclosure contemplates that any suitable condition type may be used.

As indicated by the discussion above, some policies may be specific to the specific service, e.g., a specific SMI, that is the subject of a request. Some policies may be specific to the request itself, e.g., that if a request contains certain information, then one or more specific policies should apply. Some rules may apply more broadly. For example, certain deny rules may be used to identify malicious access requests regardless of the type of service requested, and such policies may apply to all or a large subset of access requests.

In particular embodiments, content 320 may include an identification of the operations that may be used to evaluate a request. For example, operations may include "less than," "greater than," and "equal to" operations, and may include Boolean operations and other mathematical operations.

In particular embodiments, content 320 includes an identification of the actions associated with each rule and accompanying conditions, for example as specified in the "Rule-Action" key of FIG. 3. Such content may be used by the example method of FIG. 2, for example during step 240, which includes denying or permitting, based on the determination in step 230, access by the lower privileged process to the privileged firmware mode. In particular embodiments, an action may allow or deny the request, based on the comparison of the request to the applicable policies. In particular embodiments, an alert action may also be specified, for example to log or otherwise alert a user (such as an administrator) that a certain request was made and was permitted or denied. For example, step 240 may include permitting an unrecognized request (e.g., a request that had only "deny" policies applied to it) and then logging that request and its status in a logfile.

In particular embodiments, signature 330 contains cryptographic information that is used to verify the authenticity and integrity of the access-policy file. For example, as illustrated in the example of FIG. 3, the file may include a cryptographic signature, an algorithm or identification of an algorithm used to generate the signature, and an identification of the key used to generate the signature. As explained above, if the authenticity and/or integrity of the access-policy file cannot be verified then the detection engine may be disabled, other functionality may be disabled, and/or alerts may be provided.

In particular embodiments, a specific request may have several policies associated with and applied to it. For example, the access-policy file may specify that a request for the particular privileged service being requested includes both allow-type and deny-type rules. In particular embodiments the allow rules may be evaluated first, so that if any allow rule is met (e.g., if the request is verified as a legitimate request according to the applicable allow-rule conditions), then the request would be allowed. If no allow rule is met, then the detection engine could evaluate the applicable deny rules, and if a deny rule applied (e.g., if the request included content specifically identified as potentially harmful), then the request could be denied. In particular embodiments combinations of outcomes may be used; for example, a rule could be allowed if two or more allow conditions were met or allowed if one allow condition was met and no disallowed conditions were met. In particular embodiments, only deny rules may be applied to a specific request. For example, it may be very complicated to create a feasible allow rule for every kind of legitimate request e.g., because content in certain types of requests may be very variable, and so a deny-only approach can be a feasible implementation to protect and update the device against known malicious attempts to access the privileged firmware mode.

While this disclosure contemplates any suitable implementation of the detection engine described herein, below is an example pseudocode that a detection engine may use when evaluating requests to access a privileged firmware mode:

```
requested_SMI_handlerID = get_requested_SMI_handlerID(shared_buffer). // Gets the S
    MI handler ID from the shared buffer
rule_list = Get_HandlerRuleList(requested_SMI_handlerID). // Gets all the rule for the r
    equested SMI handler
rule = Load_first_rule (rule_list); // Load the first rule from rulelist.
while(rule): // while all the rule are processed
    condition_matched = true;
    rule_type = get_rule_type (rule). // Gets the rule type
    condition = Load_first_condition (rule); // Loads the rule's first condition
    while (condition): // while all the condition are processed
        condition_matched = process_condition (condition); // check if condition ma
    tches
        if (condition matched == false)
            break;
        condition = Load_next_condition (rule);
    if (rule_type == Allow)
        if (condition_matched == true)
```

```
                    requested_SMI_handler ( ); // Allowed to call requested_SMI_handler
                else
                    take_action(rule) // Action taken based on RuleAction;
            if (rule_type == Detect)
                if (condition_matched == true)
                    take_action(rule) // Action taken based on RuleAction;
            rule = Load_next_rule (rule_list);
    requested_SMI_handler ( ); // Allowed to call requested_SMI_handler, handler does not h
    ave any Allow rule and non of the Detect rules matches
```

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, such as the computer system of FIG. 4, this disclosure contemplates any suitable combination of any suitable components, devices, or systems carrying out any suitable steps of the method of FIG. 2. Moreover, this disclosure contemplates that some or all of the computing operations described herein, including the steps of the example method illustrated in FIG. 2, may be performed by circuitry of a computing device, for example the computing device of FIG. 4, by a processor coupled to non-transitory computer readable storage media, or any suitable combination thereof.

Figure 4:
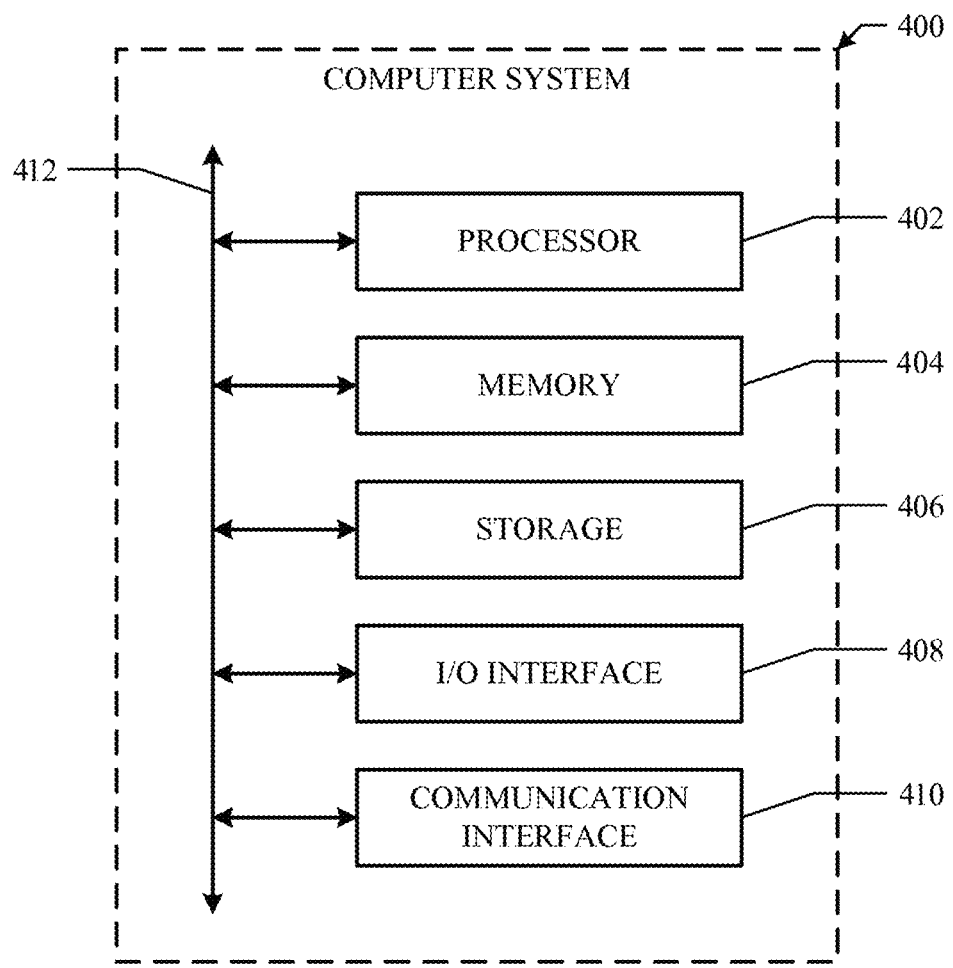
FIG. 4 illustrates an example computing device.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing a request from a lower privileged process executing on a booted computing device operating a processor in a lower-privileged mode, wherein the request is to access a privileged firmware mode of the booted computing device in which the processor operates in a full-privileged mode having full access to the booted computing device's systems and resources, wherein the privileged firmware mode comprises one or more active system management interrupts;
   accessing a set of access policies for detecting whether the request is an unauthorized access to the privileged firmware mode;
   determining, prior to operating the booted computing device in the privileged firmware mode and based on at least part of a content of the request and on the set of access policies, whether the request to access the privileged firmware mode comprising the one or more active system management interrupts is authorized; and
   denying or permitting, based on the determination, access by the lower privileged process to the privileged firmware mode.

2. The method of claim 1, wherein the request from the lower privileged process comprises a request from an operating system executing on the computing device.

3. The method of claim 1, wherein the request is accessed from a shared communication buffer on the computing device used for communications between the lower privileged process and the privileged firmware mode.

4. The method of claim 1, wherein the set of policies includes one or more allow-based rules that specifies a request will be permitted when the request comprises specific predetermined content.

5. The method of claim 1, wherein the set of policies includes one or more deny-based rules that specifies a request will be denied when the request comprises specific predetermined content.

6. The method of claim 1, wherein the privileged firmware mode is a system management mode.

7. The method of claim 1, wherein the request from a lower privileged process to access a privileged firmware mode of a computing device comprises a request to access a service provided by a system management interrupt.

8. The method of claim 1, wherein determining, based on at least part of a content of the request and on the set of access policies, whether the request to access a privileged firmware mode is authorized comprises determining whether particular data in the request matches known data or determining whether a particular pattern of bytes in the request matches a known pattern.

9. The method of claim 1, further comprising updating the set of access policies without restarting the computing device.

10. The method of claim 1, wherein the set of access policies are stored in a secured area of the firmware.

11. One or more non-transitory computer readable storage media embodying instructions and coupled to one or more processors that are operable to execute the instructions to:
    access a request from a lower privileged process executing on a booted computing device operating a processor in a lower-privileged mode, wherein the request is to access a privileged firmware mode of the booted computing device in which the processor operates in a full-privileged mode having full access to the booted computing device's systems and resources, wherein the privileged firmware mode comprises one or more active system management interrupts;
    access a set of access policies for detecting whether the request is an unauthorized access to the privileged firmware mode;
    determine, prior to operating the booted computing device in the privileged firmware mode and based on at least part of a content of the request and on the set of access policies, whether the request to access the privileged firmware mode comprising the one or more active system management interrupts is authorized; and
    deny or permit, based on the determination, access by the lower privileged process to the privileged firmware mode.

12. The media of claim 11, wherein the request from the lower privileged process comprises a request from an operating system executing on the computing device.

13. The media of claim 11, wherein the request is accessed from a shared communication buffer on the computing device used for communications between the lower privileged process and the privileged firmware mode.

14. The media of claim 11, wherein the set of policies includes one or more allow-based rules that specifies a request will be permitted when the request comprises specific predetermined content.

15. The media of claim 11, wherein the set of policies includes one or more deny-based rules that specifies a request will be denied when the request comprises specific predetermined content.

16. A system comprising one or more processors and a non-transitory computer readable storage media embodying instructions coupled to the one or more processors, the one or more processors operable to execute the instructions to:

access a request from a lower privileged process executing on a booted computing device operating a processor in a lower-privileged mode, wherein the request is to access a privileged firmware mode of the booted computing device in which the processor operates in a full-privileged mode having full access to the booted computing device's systems and resources, wherein the privileged firmware mode comprises one or more active system management interrupts;

access a set of access policies for detecting whether the request is an unauthorized access to the privileged firmware mode;

determine, prior to operating the booted computing device in the privileged firmware mode and based on at least part of a content of the request and on the set of access policies, whether the request to access the privileged firmware mode comprising the one or more active system management interrupts is authorized; and deny or permit, based on the determination, access by the lower privileged process to the privileged firmware mode.

17. The system of claim 16, wherein the request from the lower privileged process comprises a request from an operating system executing on the computing device.

18. The system of claim 16, wherein the request is accessed from a shared communication buffer on the computing device used for communications between the lower privileged process and the privileged firmware mode.

19. The system of claim 16, wherein the set of policies includes one or more allow-based rules that specifies a request will be permitted when the request comprises specific predetermined content.

20. The system of claim 16, wherein the set of policies includes one or more deny-based rules that specifies a request will be denied when the request comprises specific predetermined content.

* * * * *